US009239676B2

(12) United States Patent
Inoue

(10) Patent No.: US 9,239,676 B2
(45) Date of Patent: Jan. 19, 2016

(54) INFORMATION MANAGEMENT APPARATUS AND STORAGE MEDIUM STORING INFORMATION MANAGEMENT PROGRAM

(71) Applicant: Hiroki Inoue, Nagoya (JP)

(72) Inventor: Hiroki Inoue, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 88 days.

(21) Appl. No.: 14/063,089

(22) Filed: Oct. 25, 2013

(65) Prior Publication Data
US 2014/0118278 A1  May 1, 2014

(30) Foreign Application Priority Data
Oct. 26, 2012  (JP) ................... 2012-237285

(51) Int. Cl.
G06F 3/0488 (2013.01)
G06F 3/041 (2006.01)
G06F 3/0354 (2013.01)

(52) U.S. Cl.
CPC ........ *G06F 3/04883* (2013.01); *G06F 3/03545* (2013.01); *G06F 3/041* (2013.01)

(58) Field of Classification Search
CPC ............ G06F 3/04883; G06F 17/242–17/243; G06F 17/2725; G06K 9/00154; G06K 9/00402; G06K 9/222; G06Q 10/06311; G06Q 10/109; G04B 19/25
See application file for complete search history.

(56) References Cited

U.S. PATENT DOCUMENTS

| 6,052,481 | A | 4/2000 | Grajski et al. |
| 6,088,481 | A | 7/2000 | Okamoto et al. |
| 6,144,764 | A | 11/2000 | Yamakawa et al. |
| 6,456,740 | B1 | 9/2002 | Carini et al. |
| 2002/0067854 | A1 | 6/2002 | Reintjes et al. |
| 2002/0107885 | A1 | 8/2002 | Brooks et al. |
| 2002/0163511 | A1* | 11/2002 | Sekendur ...................... 345/179 |
| 2003/0106985 | A1* | 6/2003 | Fagin et al. ................ 250/208.1 |
| 2004/0064787 | A1 | 4/2004 | Braun et al. |
| 2008/0065396 | A1* | 3/2008 | Marshall .......................... 705/1 |

(Continued)

FOREIGN PATENT DOCUMENTS

| JP | 62-179075 A | 8/1987 |
| JP | 63-115266 A | 5/1988 |

(Continued)

OTHER PUBLICATIONS

Feb. 5, 2015—(US) Notice of Allowance—U.S. Appl. No. 14/062,964.

(Continued)

*Primary Examiner* — Sanjiv D Patel
(74) *Attorney, Agent, or Firm* — Banner & Witcoff, Ltd.

(57) ABSTRACT

An information management apparatus includes a processor, and a memory configured to store computer-readable instructions. The instructions instruct the information management apparatus to execute steps including acquiring stroke data of a trajectory of an approaching writing device detected by a detection portion capable of detecting the trajectory and including data of the trajectory of the writing device corresponding to schedule information written on a paper medium, generating image data of the trajectory based on the acquired stroke data, generating text data based on the acquired stroke data, and registering and managing the schedule information identified from the text data and the image data.

8 Claims, 13 Drawing Sheets

(56) References Cited

U.S. PATENT DOCUMENTS

2008/0181501 A1*  7/2008  Faraboschi et al. ........... 382/179
2008/0260241 A1   10/2008 Ye et al.

FOREIGN PATENT DOCUMENTS

| JP | 01-118955 A | 5/1989 |
| JP | 04-048375 A | 2/1992 |
| JP | 11-203409 A | 7/1999 |
| JP | 2000-315241 A | 11/2000 |
| JP | 2002-132792 A | 5/2002 |
| JP | 2003-323441 A | 11/2003 |
| JP | 2009-098836 A | 5/2009 |
| JP | 2010-205138 A | 9/2010 |

OTHER PUBLICATIONS

Co Pending U.S. Appl. No. 14/062,944, filed Oct. 25, 2013.
Co Pending U.S. Appl. No. 14/062,964, filed Oct. 25, 2013.
Co Pending U.S. Appl. No. 14/063,122, filed Oct. 25, 2013.
Apr. 7, 2015—(US) Non-Final Office Action—U.S. Appl. No. 14/063,122.

* cited by examiner

INFORMATION MANAGEMENT APPARATUS AND STORAGE MEDIUM STORING INFORMATION MANAGEMENT PROGRAM

CROSS REFERENCE TO RELATED APPLICATION

This application claims priority to Japanese Patent Application No. 2012-237285, filed on Oct. 26, 2012, the content of which is hereby incorporated by reference.

BACKGROUND

The present disclosure relates to an information management apparatus that is capable of acquiring information written on a paper medium, and a storage medium storing an information management program.

In related art, technology is known that digitizes information that has been written on a paper medium and stores and manages the information. For example, a form image creation apparatus is known in which stroke data of characters written on a form are received from an electronic pen. The stroke data is position information relating to a trajectory of the characters written by a user using the electronic pen. The form image creation apparatus determines whether to display the stroke data of the characters. The form image creation apparatus generates a display image by synthesizing a print image of the form with the stroke data that is determined to be displayed, and displays the display image.

SUMMARY

The user may wish to use the acquired stroke data for a variety of applications, and may particularly wish to use the stroke data for schedule management. However, the above-described form image creation apparatus can only synthesize the stroke data with the print image of the form and display the synthesized image, and the stroke data cannot be used for schedule management.

An object of the present disclosure is to provide an information management apparatus that is capable of performing schedule management based on information that is written on a paper medium by a user, and a storage medium storing an information management program.

Various embodiments provide the information management apparatus that includes a processor, and a memory. The memory is configured to store computer-readable instructions that, when executed, cause the processor to perform processes including acquiring stroke data, the stroke data being data of a trajectory of an approaching writing device that is detected by a detection portion capable of detecting the trajectory and including data of the trajectory of the writing device corresponding to schedule information written on a paper medium, generating image data of the trajectory based on the acquired stroke data, generating text data based on the acquired stroke data, and registering and managing the schedule information and the image data, the schedule information being identified from the text data.

Embodiments also provide a non-transitory computer-readable medium storing computer-readable instructions that, when executed, cause an information management apparatus to perform processes including acquiring stroke data, the stroke data being data of a trajectory of an approaching writing device that is detected by a detection portion capable of detecting the trajectory and including data of the trajectory of the writing device corresponding to schedule information written on a paper medium, generating image data for the trajectory based on the acquired stroke data, generating text data from the acquired stroke data, and registering and managing the schedule information identified from the generated text data and the generated image data.

BRIEF DESCRIPTION OF THE DRAWINGS

Embodiments will be described below in detail with reference to the accompanying drawings in which.

DETAILED DESCRIPTION

Figure 1:
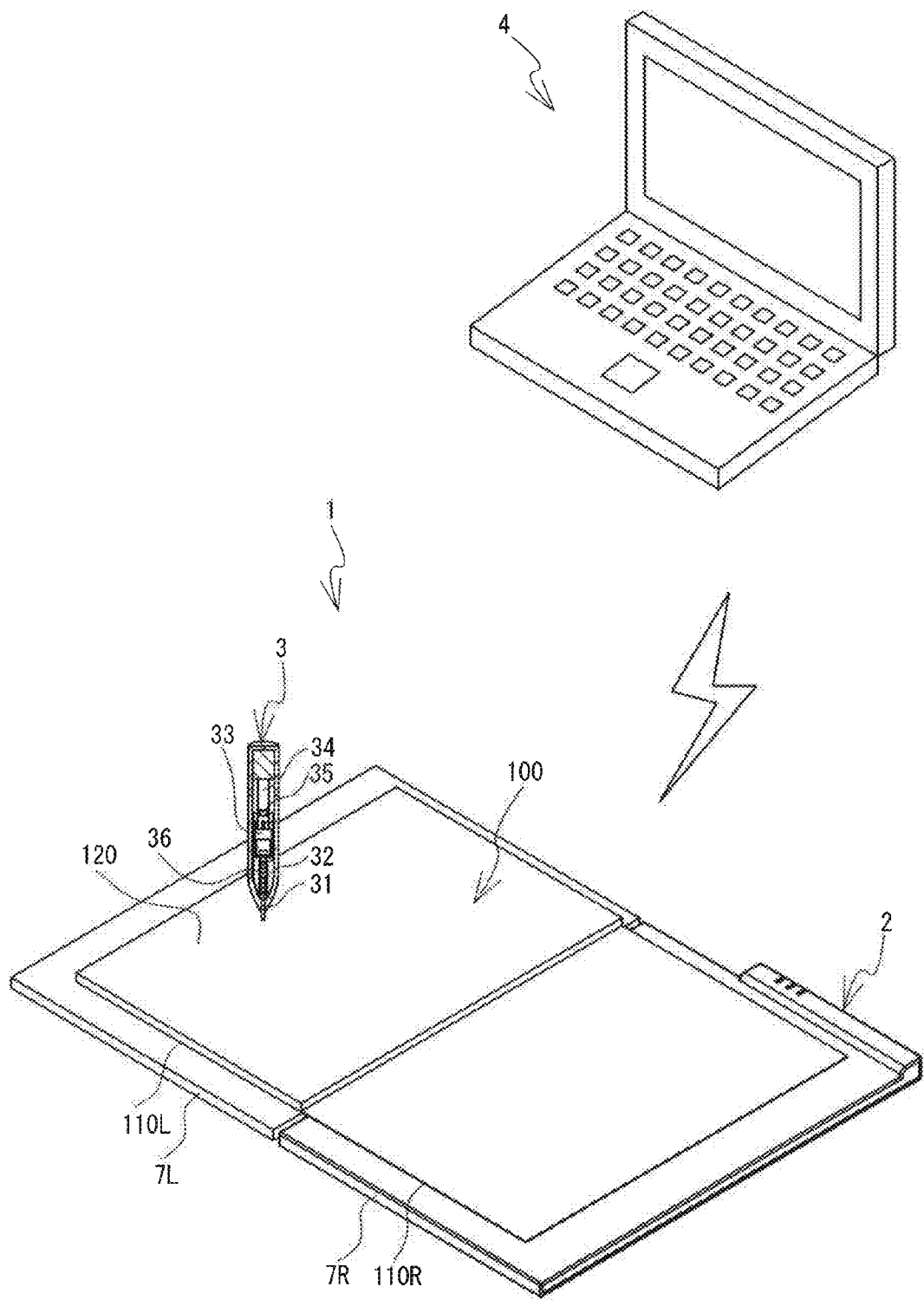
FIG. 1 is a diagram showing an overview of a handwriting input system 1.

Hereinafter, embodiments of the present disclosure will be explained with reference to the drawings. The drawings referred to are used to explain technological features that can be adopted by the present disclosure. Configurations of devices noted in the drawings, and flowcharts of various processing etc. are not limited only to the examples given and are simply explanatory examples.

An overview of a handwriting input system 1 according to a first embodiment will be explained with reference to FIG. 1. In the following explanation, an upper left side, a lower right side, an upper side, a lower side, an upper right side and a lower left side in FIG. 1 are, respectively, a left side, a right side, an upper side, a lower side, a rear side and a front side of a reading device 2.

The handwriting input system 1 includes the reading device 2, an electronic pen 3 and a PC 4. In the handwriting input system 1, a user uses the electronic pen 3 to input information by writing a text (a character, a numeral, a symbol or a graphic etc.) on a paper medium 100 that is fixed to the reading device 2. The reading device 2 detects a trajectory of the electronic pen 3 that writes the information on the paper medium 100, and acquires stroke data that will be explained later. Based on the stroke data acquired by the reading device 2, the PC 4 can generate image data etc. obtained by digitizing the information written on the paper medium 100.

A main body of the reading device 2 is formed of a pair of left and right sensor boards 7L and 7R. The sensor boards 7L and 7R are the same rectangular thin plate-shaped boards, and are arranged such that they can be opened out to a two-page spread in the left-right direction. Each of the sensor boards 7L and 7R is provided with a plurality of long thin loop coils that are arranged in both an X axis direction and in a Y axis direction. The reading device 2 is a thin light-weight handwriting input device that is portable when the sensor boards 7L and 7R are in a folded over state.

The electronic pen 3 is a known electromagnetic induction-type electronic pen. The electronic pen 3 includes a core body 31, a coil 32, a variable capacity condenser 33, a board 34, a condenser 35 and an ink storage portion 36. The core body 31 is provided on the leading end portion of the electronic pen 3. The core body 31 is urged toward the leading end of the electronic pen 3 by an elastic member that is not shown in the drawings. The leading end portion of the core body 31 protrudes to the outside of the electronic pen 3. The rear end of the core body 31 is connected to the ink storage portion 36 in which ink is stored. The ink storage portion 36 supplies ink to the core body 31. When the user writes using the electronic pen 3, the written text is formed by the ink.

In a state in which the coil 32 is wound around the periphery of the ink storage portion 36, the coil 32 is held between the core body 31 and the variable capacity condenser 33. The variable capacity condenser 33 is fixed to the inside of the electronic pen 3 by the board 34. The condenser 35 is mounted on the board 34. The condenser 35 and the variable capacity condenser 33 are connected in parallel to the coil 32 and form a known resonance (tuning) circuit.

The paper medium 100 has a notebook form that can be opened out to a two-page spread in the left-right direction. In the paper medium 100, a pair of cover sheets (a front cover sheet 110L and a back cover sheet 110R) and a plurality of paper sheets 120 are respectively bound by a part of their edges. As an example, the paper medium 100 is an A5-sized notebook. The paper medium 100 is mounted on the reading device 2 such that the front cover sheet 110L is placed on the upper surface of sensor board 7L and the back cover sheet 110R is placed on the upper surface of the sensor board 7R. The user can use the electronic pen 3 to write information on the paper sheet 120 when the paper medium 100 is mounted on the reading device 2. Position information of the electronic pen 3 that writes the information on the paper medium 100 is detected by one of the sensor boards 7L and 7R that face the paper sheet 120 on which the information has been written.

Figure 2:
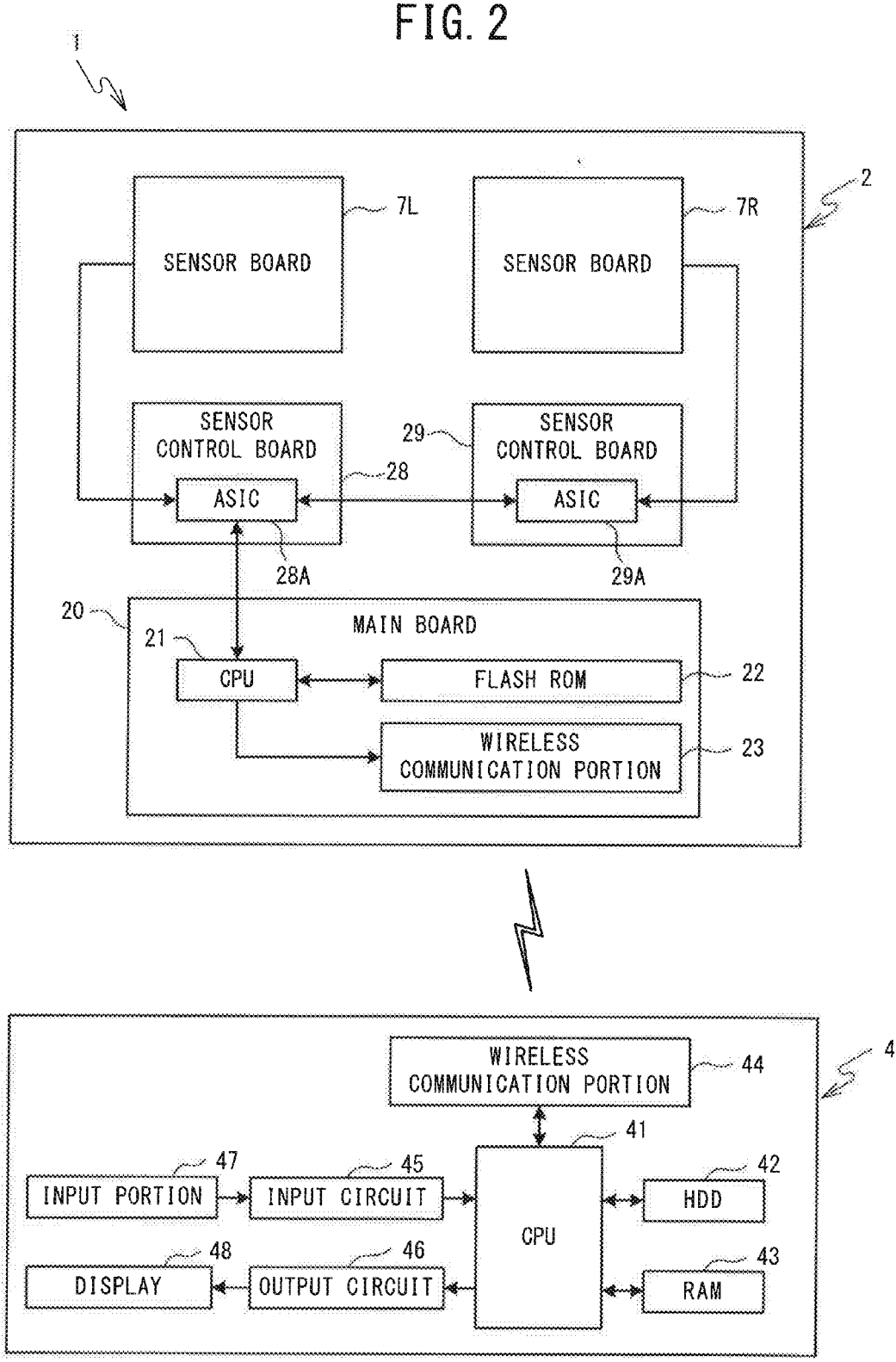
FIG. 2 is a block diagram showing an electrical configuration of a reading device 2 and a PC 4.

An electrical configuration of the handwriting input system 1 will be explained with reference to FIG. 2. First, an electrical configuration of the reading device 2 will be explained. The reading device 2 is provided with the sensor boards 7L and 7R, a main board 20 and sensor control boards 28 and 29.

The main board 20 is provided with a CPU 21, a flash ROM 22 and a wireless communication portion 23. The flash ROM 22 and the wireless communication portion 23 are electrically connected to the CPU 21. The CPU 21 controls the reading device 2. Various programs that are executed in order for the CPU 21 to control the reading device 2 are stored in the flash ROM 22. Further, data (hereinafter referred to as stroke data) that represents the trajectory of the electronic pen 3 that writes the information on the paper medium 100 (written by the electronic pen 3 on the sensor boards 7L and 7R) is stored in the flash ROM 22. The stroke data identifies the trajectory of the electronic pen 3 that writes the information on the paper medium 100, using a plurality of pieces of position information of the electronic pen 3 detected over time by the sensor boards 7L and 7R. The stroke data includes coordinate data that represents each of a plurality of positions on the trajectory. The wireless communication portion 23 is a controller that is used to execute near-field wireless communication with an external electronic device.

The sensor board 7L is electrically connected to an application-specific integrated circuit (ASIC) 28A of the sensor control board 28. The ASIC 28A performs processing to generate the stroke data based on a writing operation when the writing operation by the electronic pen 3 is performed on the sensor board 7L. This will be explained in more detail later. The sensor board 7R is electrically connected to an ASIC 29A of the sensor control board 29. The ASIC 29A performs processing to generate the stroke data based on a writing operation when the writing operation by the electronic pen 3 is performed on the sensor board 7R. This will be explained in more detail later. Of the ASIC 28A and the ASIC 29A, the ASIC 28A on the master side is directly connected to the CPU 21 and the ASIC 29A on the slave side is connected to the CPU 21 via the ASIC 28A.

The principle by which the sensor boards 7L and 7R acquire the stroke data when the writing operation is performed by the electronic pen 3 will be briefly explained. The CPU 21 controls the ASIC 28A and the ASIC 29A and causes a current (a sending current for excitation) of a specific frequency to flow to each one of the loop coils of the sensor boards 7L and 7R. In this way, a magnetic field is generated from each of the loop coils of the sensor boards 7L and 7R. For example, if the user uses the electronic pen 3 to write the information on the paper medium 100 that is fixed to the reading device 2 in this state, the electronic pen 3 comes very close to the sensor boards 7L and 7R. Thus, a resonance circuit of the electronic pen 3 resonates as a result of electromagnetic induction and an induction field is generated.

Next, the CPU 21 controls the ASIC 28A and the ASIC 29A and stops the generation of the magnetic field from the loop coils of each of the sensor boards 7L and 7R. Then, the induction field generated from the resonance circuit of the electronic pen 3 is received by the loop coils of each of the sensor boards 7L and 7R. The CPU 21 controls the ASIC 28A and the ASIC 29A and causes a signal current (a reception current) that is flowing through each of the loop coils of the sensor boards 7L and 7R to be detected. The ASIC 28A and the ASIC 29A perform this operation one by one for all of the loop coils, and the position of the electronic pen 3 is detected as coordinate information based on the reception current.

Further, in a state in which the user is using the electronic pen 3 to write the information on the paper medium 100, a writing pressure is applied to the core body 31. The inductance of the coil 32 varies depending on the writing pressure applied to the core body 31. In this way, the resonance frequency of the resonance circuit of the electronic pen 3 changes. The CPU 21 detects the change in the resonance frequency (a phase change) and identifies the writing pressure applied to the electronic pen 3. More specifically, the CPU 21 can determine whether the information is being written on the paper medium 100 by the identified writing pressure from the electronic pen 3. When it is determined that the information is being written on the paper medium 100, the CPU 21 acquires the stroke data that includes the coordinate information representing the position of the electronic pen 3, and stores the acquired stroke data in the flash ROM 22.

It should be noted that the reading device 2 may detect the position of the electronic pen 3 using another method. For example, the reading device 2 may be provided with a touch panel. It is preferable that the driving method of the touch panel be a resistive membrane type. The paper medium 100 may be placed on top of the touch panel. The CPU 21 may detect the position at which the writing pressure is applied via the touch panel when the writing operation is performed by which the electronic pen 3 writes the information on the paper medium 100.

Next, the electrical configuration of the PC 4 will be explained. The PC 4 is provided with a CPU 41 that controls the PC 4. The CPU 41 is electrically connected to a hard disk drive (HDD) 42, a RAM 43, a wireless communication portion 44, an input circuit 45 and an output circuit 46. Various programs that are executed by the CPU 41 are stored in the HDD 42, along with a schedule data table 95 (refer to FIG. 5) that will be explained later. An information management program, which is used to execute first main processing (refer to FIG. 6) that will be explained later, is also stored in the HDD 42.

The PC 4 is provided with a medium reading device (a CD-ROM drive, for example) that is not shown in the drawings. The PC 4 can read an information management program that is stored in a storage medium (a CD-ROM, for example) from the medium reading device and can install the information management program in the HDD 42. Additionally, the information management program may be received from an external device (not shown in the drawings) that is connected to the PC 4 or from a network and installed in the HDD 42.

A variety of temporary data are stored in the RAM 43. The wireless communication portion 44 is a controller that performs near-field wireless communication with an external electronic device. The input circuit 45 performs control to transmit an instruction to the CPU 41 from an input portion 47 (such as a mouse, a keyboard, a touch panel or the like). The output circuit 46 performs control to display an image on a display 48 in accordance with an instruction from the CPU 41.

In the present embodiment, the near-field wireless communication can be performed between the wireless communication portion 23 of the reading device 2 and the wireless communication portion 44 of the PC 4. The reading device 2 transmits the stroke data saved in the flash ROM 22 to the PC 4 by the near-field wireless communication. The PC 4 generates image data etc. by digitizing the information written on the paper medium 100 based on the stroke data transmitted from the reading device 2. A format of the image data is, for example, a JPEG format, a GIF format, a PNG format or a BMP format. Note that the communication when the stroke data is transmitted from the reading device 2 to the PC 4 is not limited to the wireless communication and wired communication may be used.

Figure 3:
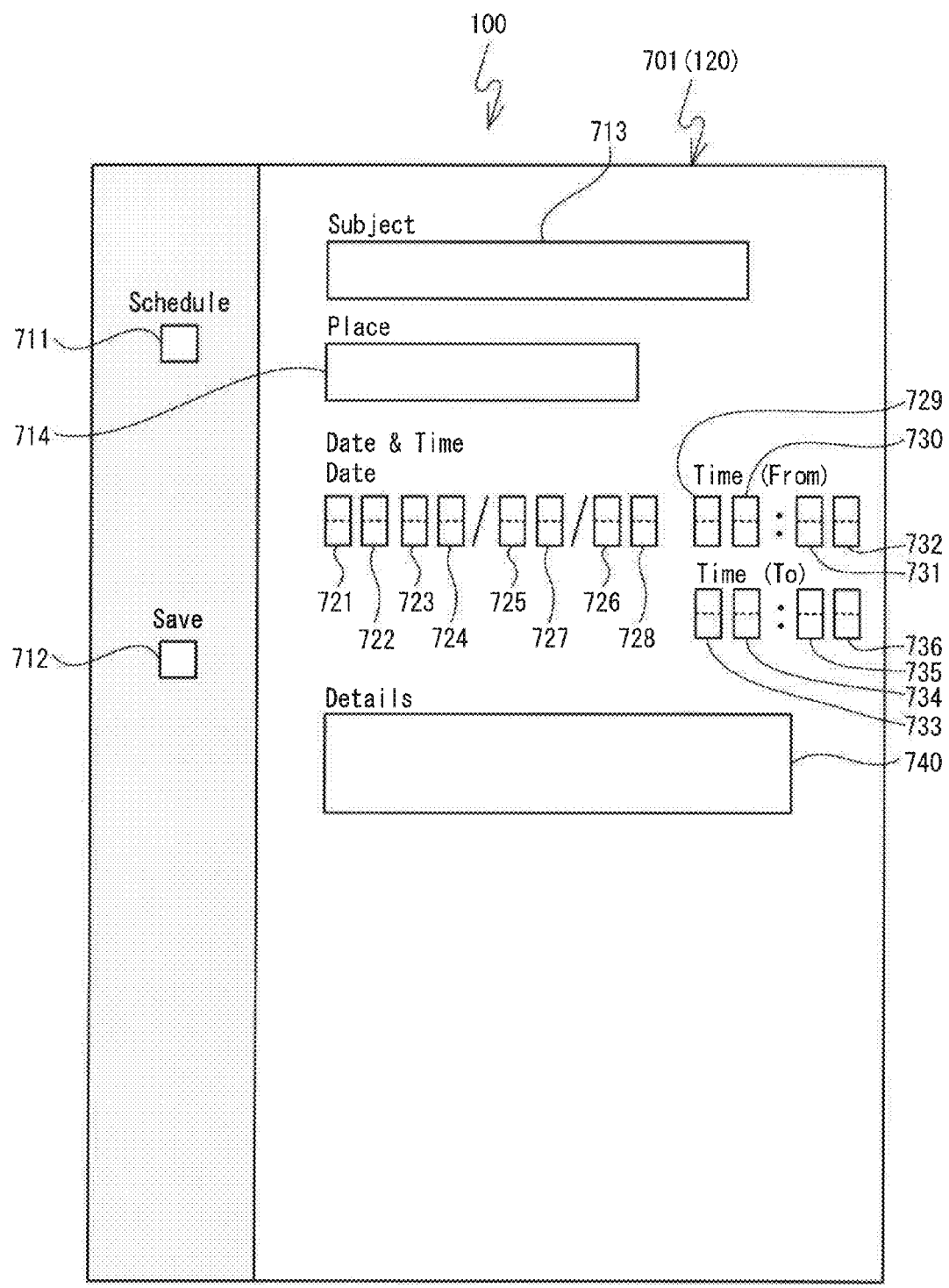
FIG. 3 is a diagram showing a paper sheet 701.

An example of the paper sheet 120 (namely, a paper sheet 701) of the paper medium 100 will be explained with reference to FIG. 3 and FIG. 4. In the following explanation, the lower side, the upper side, the left side and the right side in FIG. 3 and FIG. 4 respectively define the front side, the rear side, the left side and the right side of the paper sheet 701. The paper sheet 701 is a paper sheet of a page of the paper medium 100 that is used to write a schedule. In FIG. 3, an illustration of the other pages of the paper medium 100 is omitted.

The user can use the paper sheet 120 of various types of format. The types of format are, for example, a schedule format, a memo format, a To Do format and so on. The format of the paper sheet 701 shown in FIG. 3 is the schedule format. The user can register schedule information on schedule management software (that will be explained later) by writing the schedule information on the paper sheet 701.

Figure 4:
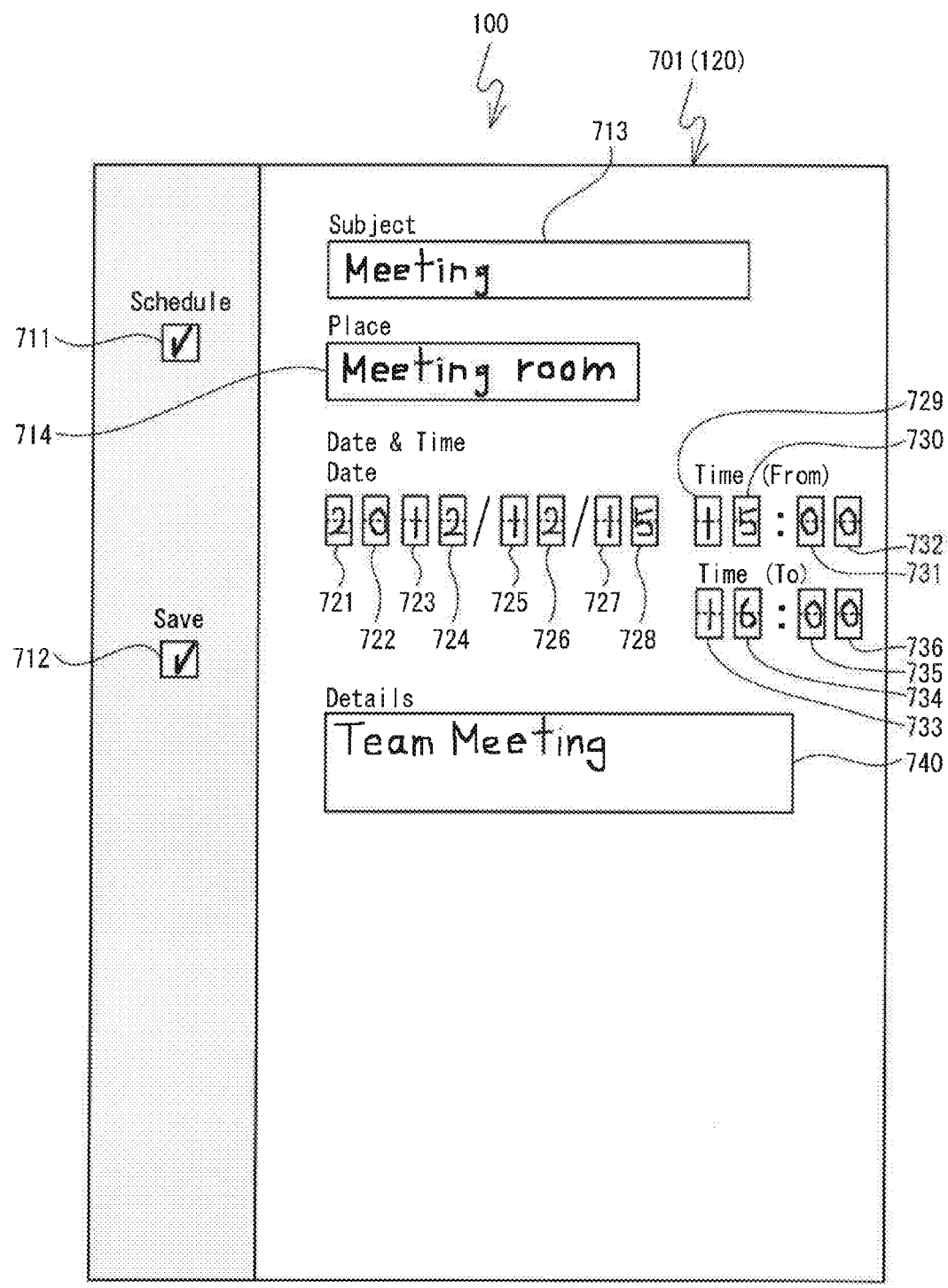
FIG. 4 is a diagram showing the paper sheet 701 on which schedule information is written.

As shown in FIG. 3 and FIG. 4, a square check box 711 is provided in an upper left portion of the paper sheet 701. A square check box 712 is provided below the check box 711. A writing area 713, which is long in the left-right direction, is provided to the right of the check box 711 and on an upper portion of the paper sheet 701. A writing area 714, which is long in the left-right direction, is provided below the writing area 713. Writing areas 721 to 732, which are long in the up-down direction, are provided side by side from the left toward the right below the writing area 714. Writing areas 733 to 736, which are long in the up-down direction, are provided below the writing areas 729 to 732. A writing area 740, which is long in the left-right direction, is provided below the writing areas 733 to 736.

The check boxes 711 and 712, and the writing areas 713, 714, 721 to 736 and 740 are provided in predetermined positions that are set in advance. Coordinate information for coordinates on the sensor boards 7L and 7R corresponding to positions of the writing areas 713, 714, 721 to 736 and 740 is stored in the schedule data table 95 (refer to FIG. 5) that will be explained later.

A character string reading "Schedule" is printed above the check box 711. A character string reading "Save" is printed above the check box 712. A character string reading "Subject" is printed above the writing area 713. A character string reading "Place" is printed above the writing area 714. A character string reading "Date & Time" and a character string reading "Date" are printed above the writing areas 721 to 728. A character string reading "Time (From)" is printed above the writing areas 729 to 732. A character string reading "Time (To)" is printed above the writing areas 733 to 736. A character string reading "Details" is printed above the writing area 740.

In the present embodiment, schedule information is written in the writing areas 713, 714, 721 to 736 and 740. A subject for the schedule is written in the writing area 713. In the example shown in FIG. 4, "Meeting" is written in the writing area 713. The location at which the schedule written in the writing area 713 will take place is written in the writing area 714. In the example shown in FIG. 4, "Meeting room" is written in the writing area 714. Various pieces of information are written in the writing area 740, such as details of the schedule written in the writing area 714. In the example shown in FIG. 4, "Team Meeting" is written in the writing area 714.

The date on which the schedule written in the writing area 713 will take place is written in the writing areas 721 to 728 (the year, month and day in the present embodiment). More specifically, the thousands place, the hundreds place, the tens place and the ones place of the "Year" is written in the writing areas 721, 722, 723 and 724, respectively. The tens place and the ones place of the "Month" is written in the writing areas 725 and 726, respectively. The tens place and the ones place of the "Day" is written in the writing areas 727 and 728, respectively. In the example shown in FIG. 4, each of numerals corresponding to "2012/12/15," which is information of the date (hereinafter referred to as date information) is written in the writing areas 721 to 728. Note that, "/ (slash)," which represents the partition between "Year" and "Month" is printed between the writing area 724 and the writing area 725. "/ (slash)," which represents the partition between "Month" and "Day" is printed between the writing area 726 and the writing area 727.

The start time of the schedule written in the writing area 713 is written in the writing areas 729 to 732. More specifically, the tens place and the ones place of the "Hour" is written in the writing areas 729 and 730, respectively. The tens place and the ones place of the "Minutes" is written in the writing areas 731 and 732, respectively. In the example shown in FIG. 4, each of numerals corresponding to "15:00," which is information of the start time, is written in the writing areas 729 to 732. The finish time of the schedule written in the writing area 713 is written in the writing areas 733 to 736. More specifically, the tens place and the ones place of the "Hour" is written in the writing areas 733 and 734, respectively. The tens place and the ones place of the "Minutes" is written in the writing areas 735 and 736, respectively. In the example shown in FIG. 4, each of numerals corresponding to "16:00," which is information of the finish time, is written in the writing areas 733 to 736. Note that, ": (colon)," which represents the partition between "Hour" and "Minutes" is printed between the writing area 730 and the writing area 731. ": (colon)," which represents the partition between "Hour" and "Minutes" is printed between the writing area 734 and the writing area 735.

Check marks are written in the check boxes 711 and 712 (refer to FIG. 4). The shape of the check marks is not particularly limited. The HDD 42 of the PC 4 stores information in which coordinate information for coordinates on the sensor boards 7L and 7R corresponding to the check box 711 is associated with information indicating that the format is the schedule format. Hereinafter, the data that has been associated in this manner is referred to as "associated data." When the user writes the check mark in the check box 711 using the electronic pen 3, the CPU 41 of the PC 4 detects that the stroke data exists on the coordinates on the sensor boards 7L and 7R corresponding to the check box 711. Then, by referring to the associated data, the CPU 41 of the PC 4 identifies that the format of the paper sheet 701 is the schedule format (refer to step S13 in FIG. 6, to be explained later).

The flash ROM 22 of the reading device 2 stores the coordinate information for the coordinates on the sensor boards 7L and 7R corresponding to the check box 711 in association with information indicating that a Save command has been input. When the user writes the check mark in the check box 712 using the electronic pen 3, the CPU 21 of the reading device 2 detects that the stroke data exists on the coordinates on the sensor boards 7L and 7R corresponding to the check box 712. In this case, the CPU 21 of the reading device 2 transmits, to the CPU 41 of the PC 4, the stroke data that has been acquired by the user writing the schedule information on the paper sheet 701. The CPU 41 of the PC 4 acquires (receives) the transmitted stroke data (refer to step S12 in FIG. 6, to be explained later).

Figure 5:
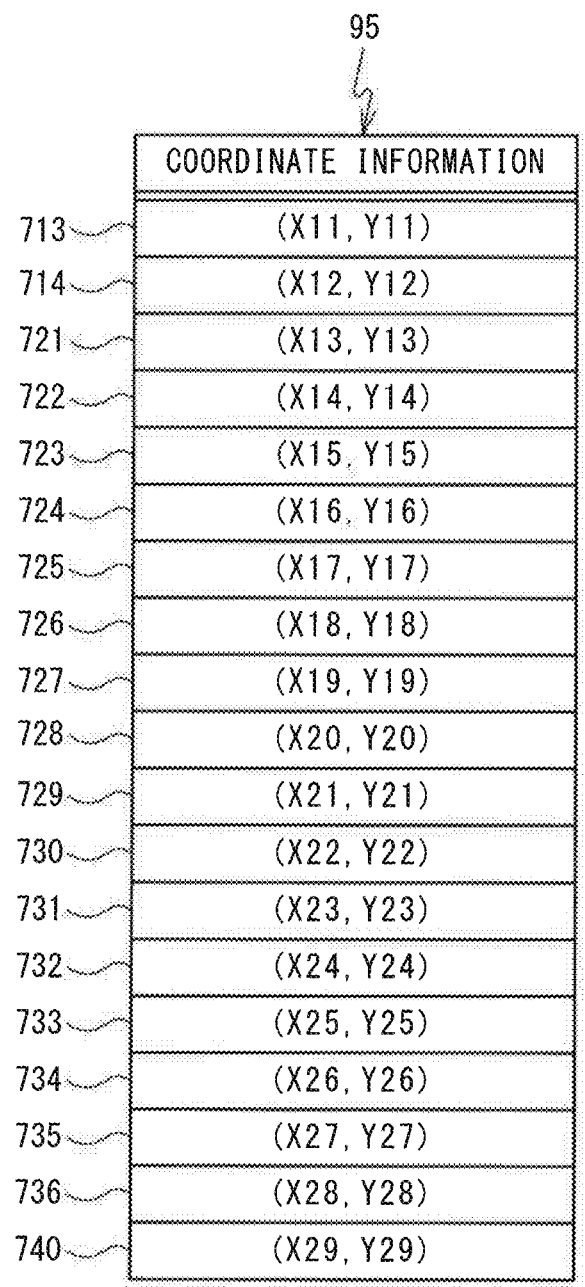
FIG. 5 is a data configuration diagram of a schedule data table 95.

The schedule data table 95 will be explained with reference to FIG. 5. The schedule data table 95 is stored in the HDD 42 of the PC 4. Coordinate information of the writing areas 713, 714, 721 to 736 and 740 of the schedule format paper sheet 701 is registered in the schedule data table 95. The coordinate information is set to the coordinates on the sensor boards 7L and 7R corresponding to positions on the paper sheet 701 at which the writing areas 713, 714, 721 to 736 and 740 are arranged. In FIG. 5, for the purpose of the explanation, reference numerals 713, 714, 721 to 736 and 740 corresponding to the coordinate information of each of the writing areas are illustrated. It should be noted that only one of the coordinates (coordinates (X11, Y11), for example) is noted in the coordinate information for each of the writing areas 713, 714, 721 to 736 and 740 shown in FIG. 5. However, in actuality, coordinates corresponding to a square-shaped area of each of the writing areas 713, 714, 721 to 736 and 740 are registered.

The first main processing will be explained with reference to FIG. 6. The first main processing is processing to generate text data and image data from the stroke data and to register the generated data in the schedule management software. The user operates the input portion 47 and inputs a command to activate an application that executes the first main processing. The CPU 41 of the PC 4 reads, from the HDD 42, programs to execute the application and expands the programs into the RAM 43. An information management program for the CPU 41 to perform the first main processing is included in the programs to execute the application. The CPU 41 performs the first main processing in accordance with commands of the information management program.

Figure 6:
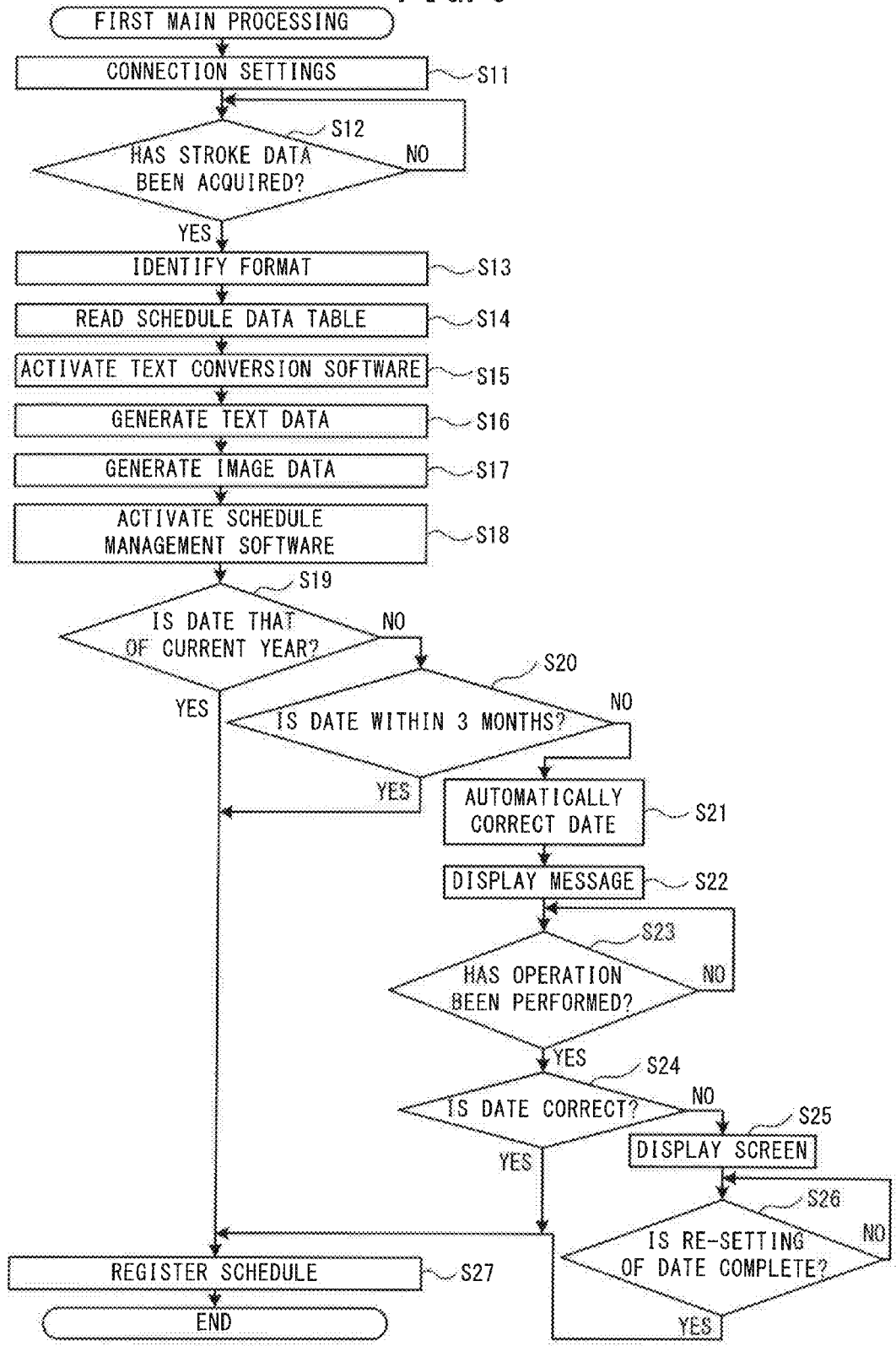
FIG. 6 is a flowchart of first main processing.

As shown in FIG. 6, first, connection settings are performed with the CPU 21 of the reading device 2 via the wireless communication portions 23 and 44, and a state is set in which communication between the CPU 21 of the reading device 2 and the CPU 41 of the PC 4 is possible (step S11). Next, a determination is made as to whether the stroke data transmitted by the CPU 21 of the reading device 2 has been acquired (step S12). When the stroke data has not been acquired (no at step S12), the processing at step S12 is repeated.

Hereinafter, an explanation is given while exemplifying a case in which the user writes schedule information on the paper sheet 701 as shown in FIG. 4. The user opens the paper medium 100 and arranges the paper sheet 701 on the sensor board 7L or on the sensor board 7R. The user uses the electronic pen 3 to write a check mark in the check box 711 (refer to FIG. 4). In addition, the user writes schedule information in the writing areas 713, 714, 721 to 736 and 740 (refer to FIG. 4).

While the check mark is being written in the check box 711 and the schedule information is being written in the writing areas 713, 714, 721 to 736 and 740, the CPU 21 of the reading device 2 acquires the stroke data. The CPU 21 stores the acquired stroke data in the flash ROM 22. Then, when the user writes a check mark in the check box 712, the CPU 21 of the reading device 2 detects that stroke data exists at coordinates on the sensor boards 7L and 7R corresponding to the check box 712. In this case, the CPU 21 of the reading device 2 transmits the stroke data stored in the flash ROM 22 to the CPU 41 of the PC 4. The transmitted stroke data includes the data of the trajectory of the electronic pen 3 corresponding to the schedule information written on the paper sheet 701. The CPU 41 of the PC 4 acquires the stroke data transmitted from the reading device 2 (yes at step S12). Note that the acquired stroke data is stored in the HDD 42 or in the RAM 43.

Next, the format of the paper sheet 701 is identified (step S13). For example, the PC 4 detects, from the stroke data acquired at step S12, that the stroke data exists at the coordinates on the sensor boards 7L and 7R corresponding to the check box 711. Then, by referring to the above-described associated data (not shown in the drawings), the PC 4 identifies that the format of the paper sheet 701 is the schedule format.

Next, a data table corresponding to the format identified at step S13 is read out from the HDD 42 (step S14). In the present embodiment, the schedule format is identified at step S13. Therefore, the schedule data table 95 shown in FIG. 5 is read out from the HDD 42. Note that, although not shown in the drawings, when a format other than the schedule format is identified at step S13, the CPU 41 reads out, from the HDD 42, the data table identified at step S13 that corresponds to a format other than the schedule format. Then, the CPU 41 performs the processing using the identified format other than the schedule format. In the following explanation, processing at step S15 to step S27 is processing in the case in which the schedule format is used.

Next, text conversion software is activated (step S15). The text conversion software is software that can generate data of text (that is, text data) from the stroke data. Note that the text conversion software may be activated in accordance with an operation of the input portion 47 by the user. Further, the text conversion software may be a software that is separate from the application including the first main processing or may be a software that is included in the application. In the present embodiment, the text conversion software is a software that is separate from the application. The text conversion software is operated by the CPU 41 performing processing in accordance with a text conversion software program that is stored in the HDD 42. The text conversion software is, for example, an optical character recognition (OCR) software.

Text data is generated from the stroke data acquired at step S12 (step S16). At step S16, first, coordinate information in the schedule data table 95 read out at step S14 and coordinate information included in the stroke data are referred to, and the stroke data inside each of the writing areas 713, 714, 721 to 736 and 740 is identified. The identified stroke data is transferred to the text conversion software activated at step S15 and the text data is generated. Then, the generated text data is transferred from the text conversion software to the application of the present embodiment. In this way, a state is obtained in which the text data based on the stroke data corresponding to each of the writing areas 713, 714, 721 to 736 and 740 has been generated (step S16). It should be noted that when the OCR software generates the text data, for example, image data representing the trajectory represented by the stroke data is provisionally generated, and OCR processing is performed on the provisionally generated image data to generate the text data. Note that various methods are available to generate the text data from the trajectory represented by the stroke data. For example, the CPU 41 may generate the text data from the stroke data using known pattern matching technology.

Figure 7:
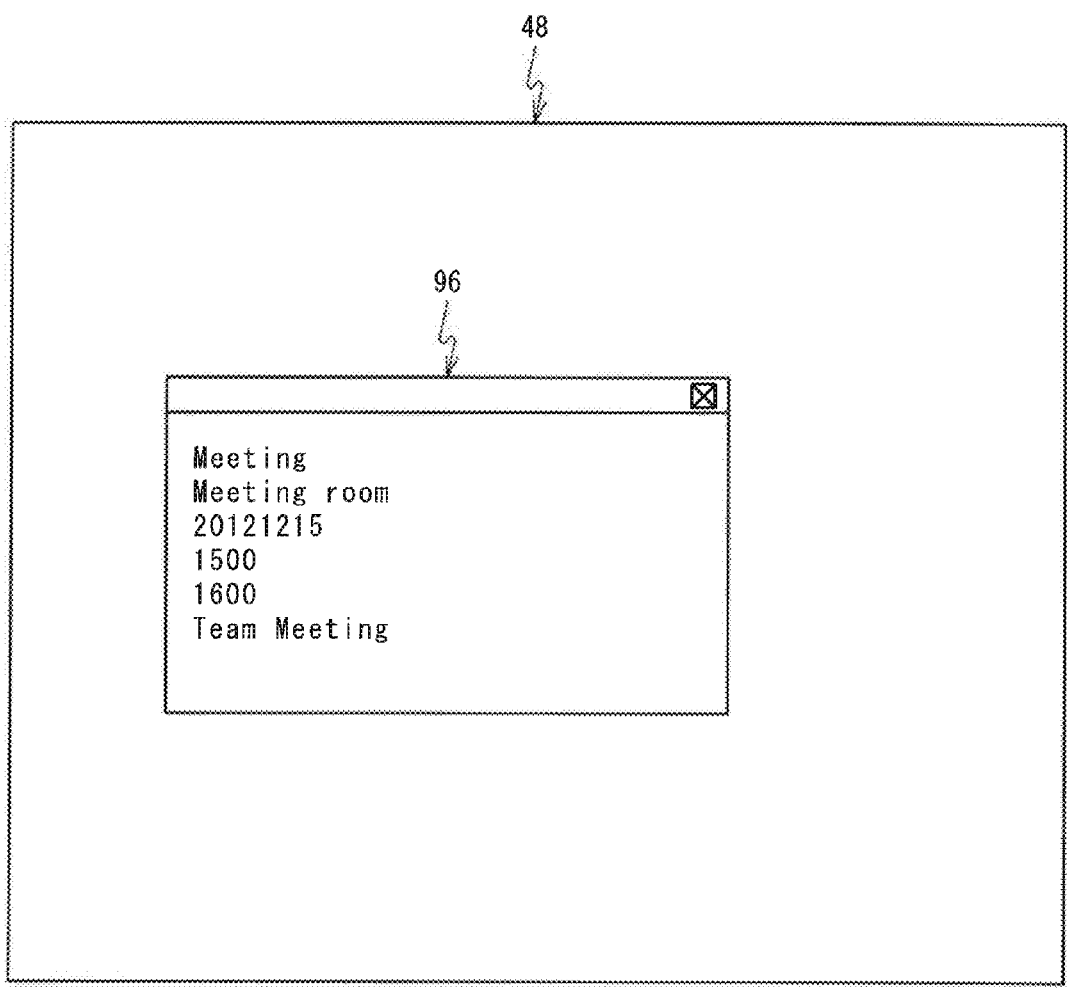
FIG. 7 is a diagram showing a text display screen 96 displayed on a display 48.

A text display screen 96 is shown in FIG. 7, for a case in which texts based on the text data acquired at step S16 are displayed on the display 48. "Meeting" is displayed on the first line of the text display screen 96 and "Meeting room" is displayed on the second line. "20121215" is displayed on the third line and "1500" is displayed on the fourth line. "1600" is displayed on the fifth line and "Team Meeting" is displayed on the sixth line. Each of these displays corresponds to the schedule information (refer to FIG. 4) written in the writing areas 713, 714, 721 to 736 and 740.

Figure 8:
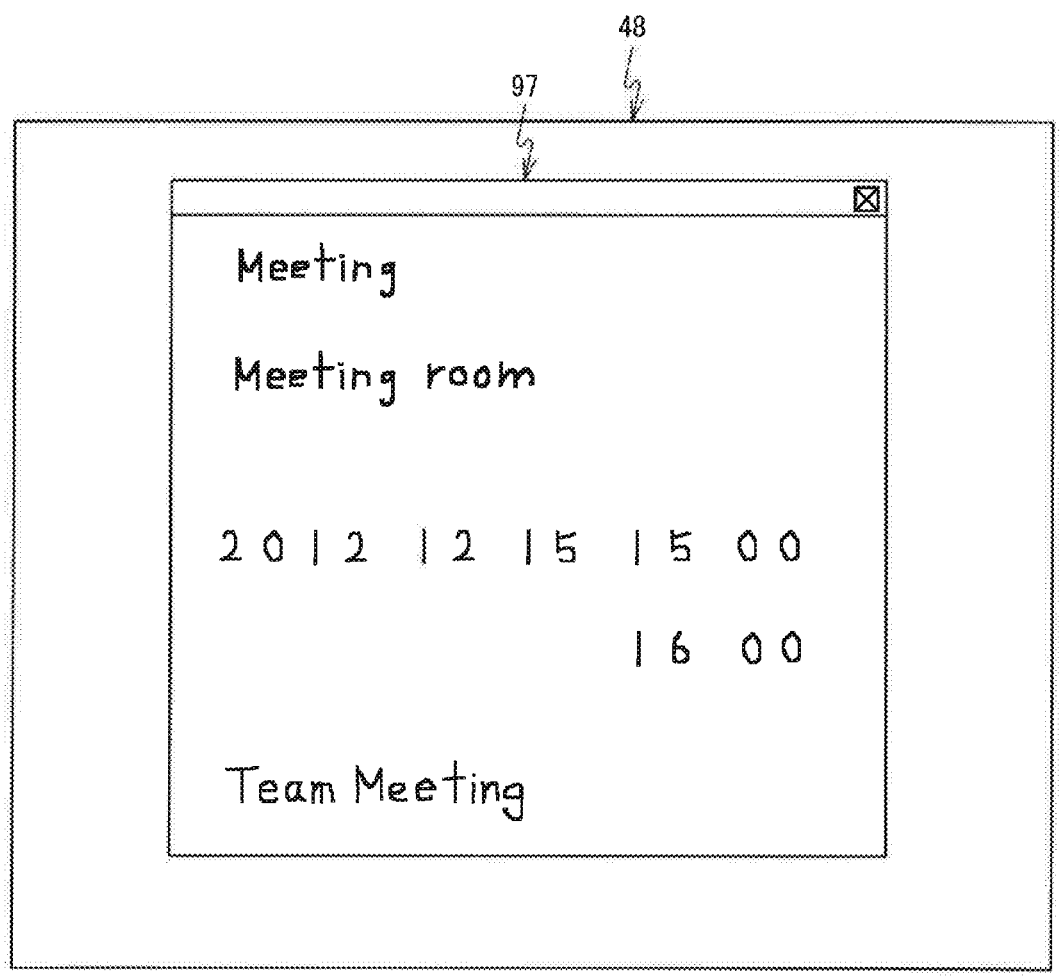
FIG. 8 is a diagram showing a screen 97 displayed on the display 48.

Next, image data for the trajectory based on the stroke data acquired at step S12 is generated (step S17). An image 97 is shown in FIG. 8 for a case in which an image based on the image data generated at step S17 is displayed on the display 48. As shown in FIG. 8, the image 97 corresponds to the schedule information (refer to FIG. 4) written by the user on the paper sheet 701.

Next, the schedule management software is activated (step S18). The schedule management software is software that can manage a schedule. Note that the schedule management software may be activated in accordance with an operation of the input portion 47 by the user. Further, the schedule management software may be a software that is separate from the application including the first main processing or may be a software that is included in the application. In the present embodiment, the schedule management software is a software that is separate from the application. The schedule management software is operated by the CPU 41 performing processing in accordance with a schedule management software program that is stored in the HDD 42.

Next, a determination is made as to whether a date represented by date information that is identified from the text data acquired at step S16 is a date of the current year (step S19). For example, the date information identified from the text data "20121215" as shown in FIG. 7 is namely the date "2012 Dec. 15" and the date on which the first main processing is being performed is "2012 Nov. 30." In this case, both dates are for the year "2012" and it is thus determined that the date is of the current year (yes at step S19). Then, the schedule information identified from the text data generated at step S16 and the image data generated at step S17 are registered in the schedule management software that manages the schedule (step S27). In the present embodiment, as an example, when the data file of the text data and the data file of the image data are arranged (stored in the HDD 42) in a specific folder (a folder stored in the HDD 42) that can be referred to by the schedule management software, the schedule management software registers the image data and the schedule information identified from the text data. In this case, in the processing at step S27, the data file of the text data generated at step S16 and the data file of the image data generated at step S17 are arranged in the specific folder.

Figure 9:
FIG. 9 is a diagram of a schedule display screen 98 that is displayed on the display 48.

A schedule display screen 98 of the schedule management software in the case in which the schedule information and the image data are registered is shown in FIG. 9. As shown in FIG. 9, based on the data file of the text data arranged in the specific folder at step S27, a start time "15:00" to a finish time "16:00" for "2012 Dec. 15" are displayed along with "Meeting" which is written in the writing area 713 (refer to FIG. 4). For example, when the user selects the character string "Meeting" via the input portion 47, the location "Meeting room," details "Team Meeting" and an image that is the same as the image 97 (refer to FIG. 8) based on the image data are displayed on the display 48.

As shown in FIG. 6, in the processing at step S19, when it is determined that the date is not of the current year (no at step S19), a determination is made as to whether the date is within 3 months of the date on which the first main processing is being performed (step S20). When the date is within 3 months (yes at step S20), the processing at the above-described step S27 is performed.

When the date is not within 3 months (no at step S20), the date representing the date information included in the text data acquired at step S16 is automatically corrected (step S21). For example, in contrast to the content shown in FIG. 7, it is assumed that the date representing the date information included in the text data is "2013 Dec. 15." Then, it is assumed that the date at the time at which the first main processing is performed is "2012 Nov. 30." In this case, the date representing the date information is not a date of the current year (no at step S19), and is not a date within 3 months (no at step S20). As a result, the "year" of the date representing the date information of the schedule information is automatically corrected and "2013 Dec. 15" becomes "2012 Dec. 15." In other words, the date representing the date information in the text data "20131215" is corrected to "20121215," which is the same as the content shown in FIG. 7.

Next, a confirmation message is displayed on the display 48 (step S22). The confirmation message displayed at step S22 is, for example, a message reading: "The schedule date has been changed to Dec. 15, 2012. Is this date correct?" Further, at step S22, a display is displayed on the display 48 to allow the user to select whether the date is correct.

Next, a determination is made as to whether an operation by the user via the input portion 47 to select whether the date is correct has been performed (step S23). When the operation has not been performed (no at step S23), the processing at step S23 is repeated (step S23). When the operation has been performed (yes at step S23), a determination is made as to whether the operation detected at step S23 is an operation indicating that the date is correct (step S24). When the operation indicating that the date is correct has been performed (yes at step S24), the processing at step S27 is performed. In this case, the schedule information is registered in the schedule management software using the date automatically corrected at step S21 (step S27).

When the operation detected at step S23 is the operation indicating that the date is not correct (no at step S24), an input screen (not shown in the drawings) to input the correct date is displayed on the display 48 (step S25). At step S25, for example, similarly to the case shown in FIG. 7, a text is displayed on the display 48 based on the text data that was generated at step S16 and automatically corrected at step S21. The user can re-set the correct date by changing the date of the displayed text.

Next, a determination is made as to whether the re-setting of the date is complete (step S26). When the input is not complete (no at step S26), the processing at step S26 is repeated. For example, the user corrects the date in the text displayed at step S25 and re-sets the date. Then, the user performs an operation on the input portion 47 indicating that the re-setting of the date is complete. When the operation has been performed indicating that the re-setting of the date is complete, it is determined that the re-setting of the date is complete (yes at step S26), and the processing at step S27 is performed. In this case, the schedule information is registered in the schedule management software using the date re-set at step S26 (step S27). After the processing at step S27 is performed, the first main processing is ended.

The processing according to the present embodiment is performed as described above. In the present embodiment, the schedule information and the image data can be registered in the schedule management software (step S27). As a result, the schedule can be managed based on the schedule information (refer to FIG. 4) written on the paper sheet 701.

In addition, not only the schedule information but also image data can be registered in the schedule management software (step S27). Therefore, the user can refer to the original text that is written on the paper sheet 701 (refer to FIG. 8). Further, when the text data is generated at step S16, even if it is converted to a text that is different to the original text written by the user on the paper sheet 701, the user can easily correct the text data while referring to the image based on the image data.

In addition, when it is not the date of the current year (no at step S19) and it is not the date within 3 months (no at step S20), the date is automatically corrected (step S21). In other words, when the date is further ahead in time than a specific timing (in the present embodiment, a timing that satisfies the conditions of being a date of the current year and being a date within 3 months), the date is automatically corrected. When the date is further ahead in time than the specific timing, it is possible that the user has made an error in writing the date. Further, when the text data is generated at step S16, there is a possibility that the text is converted to the text that is different to the original text written by the user on the paper sheet 701. In these cases, the date is automatically corrected at step S21, and thus ease of use for the user is improved compared to a case in which the user corrects the date to the correct date by operating the input portion 47.

It should be noted that the present disclosure is not limited to the above-described embodiment and various modifications can be made. For example, when the date is further ahead in time than the specific timing (in the present embodiment, a timing that satisfies the conditions of being a date of the current year and being a date within 3 months), the date is automatically corrected, but the specific timing is not limited to the case described in the present embodiment. For example, the specific timing may be a date that is 6 months ahead in time. Further, when the date is automatically corrected at step S21, the "year" is corrected, but the present disclosure is not limited to this example. For example, the "month" may be corrected or the "day" may be corrected.

Additionally, when the check mark is written in the check box 712 (refer to FIG. 4), the stroke data is transmitted from the CPU 21 of the reading device 2 to the CPU 41 of the PC 4, but the present disclosure is not limited to this example. For example, the stroke data may be transmitted from the CPU 21 of the reading device 2 to the CPU 41 of the PC 4 every time the electronic pen 3 is used to write the schedule information on the paper sheet 701. Then, the processing from step S13 to step S27 (refer to FIG. 6) may be performed when the CPU 41 of the PC 4 has received (acquired) the stroke data when the check mark is written in the check box 712. Further, the reading device 2 may store the stroke data corresponding to the schedule information in the flash ROM 22, and the stroke data may be transmitted from the CPU 21 of the reading device 2 to the CPU 41 of the PC 4 when the connection settings for the communication between the CPU 21 of the reading device 2 and the CPU 41 of the PC 4 are made at a later stage (a few days later, for example).

In addition, the image data generated at step S17 may include data to display the same text as that printed on the paper sheet 701, such as "Subject," "Place," "Date & Time," "Date," "Time (From)," "Time (To)," and "Details." Further, the image data may include data to display the same outer contours as the outer contours of the writing areas 713, 714, 721 to 736 and 740 printed on the paper sheet 701 (refer to FIG. 3 and FIG. 4). In this case, the image displayed based on the image data is different to the case shown in FIG. 8, and the image is the same as the state in which the schedule information is written on the paper sheet 701 (refer to FIG. 4). In this case, the user can more easily recognize the information that he or she has input him/herself.

Further, the schedule format is not limited to the case of the paper sheet 701. For example, the writing areas 721 to 724 in which the "year" is written on the paper sheet 701 need not necessarily be provided. In this case, of the date ("month" and "day") written in the writing areas 725 to 728, the schedule information may be registered on the date that is closest to the date on which the first main processing is being performed. For example, when respective numerals indicating "12/15" are written in the writing areas 725 to 728, and when the date on which the first main processing is being performed is "2012 Nov. 30," the schedule information is registered to "2012 Dec. 15."

Figure 10:
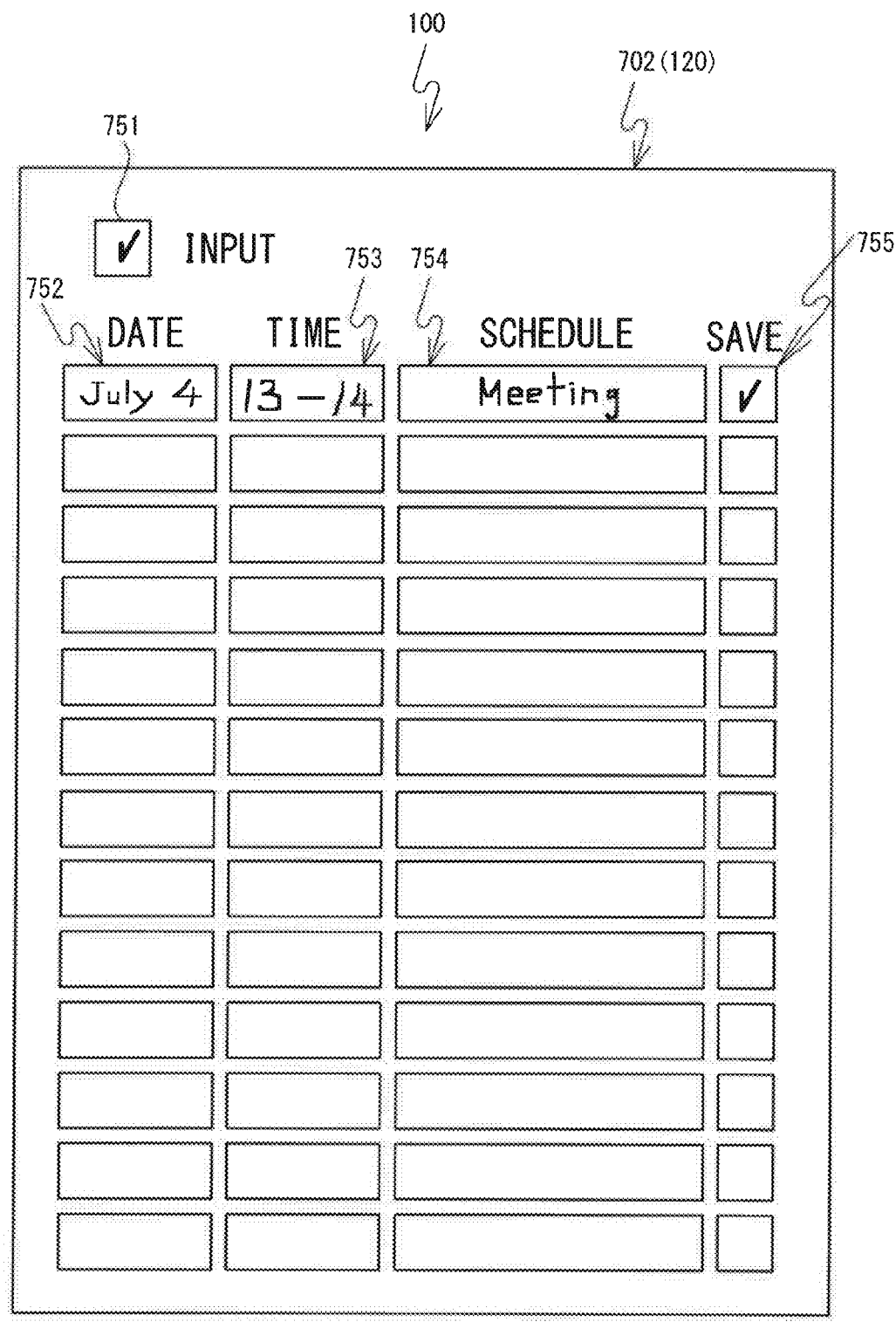
FIG. 10 is a diagram showing a paper sheet 702.

Further, for example, the schedule format may be a format of a paper sheet 702 shown in FIG. 10. A check box 751 is provided in an upper left portion of the paper sheet 702. In addition, 13 each of writing areas 752, 753 and 754 that are aligned side by side in the left-right direction are provided in the front-rear direction below the check box 751. Check boxes 755 are provided to the right of each of the writing areas 754.

The date information is written in the writing area 752. In the example shown in FIG. 10, "July 4" which indicates that the schedule is "July 4th" is written. Information about the time is written in the writing area 753. In the example shown in FIG. 10, "13-14" which indicates that the schedule is from "13:00 to 14:00" is written. Of the schedule information, a title etc. is written in the writing area 754. In the example shown in FIG. 10, "Meeting" is written.

When the paper sheet 702 shown in FIG. 10 is used, the user first writes the check mark in the check box 751. When the CPU 21 of the reading device 2 has detected that the check mark is written in the check box 751, the CPU 21 starts storing the stroke data in the flash ROM 22. As shown in FIG. 10, the user writes the date "July 4," the time "13-14" and the schedule "Meeting" on the paper sheet 702. The stroke data corresponding to the date "July 4," the time "13-14" and the schedule "Meeting" is stored in the flash ROM 22. Then, when the user writes a check mark in the check box 755, the stroke data stored in the flash ROM 22 is transmitted to the PC 4 and is acquired by the CPU 41 (yes at step S12 in FIG. 6). Then, based on the stroke data, the processing is performed such that the text data and the image data are registered in the schedule management software (refer to step S12 to step S27 in FIG. 6).

Note that the paper sheet 702 shown in FIG. 10 is provided with the writing areas 752, 753 and 754 and the check boxes 755 that are aligned side by side in the left-right direction and provided in the plurality in the front-rear direction. As a result, the user can write a plurality of pieces of schedule information on the paper sheet 702. Then, when a check mark is written in any one of the plurality of check boxes 755, processing is performed to register, in the schedule management software, the schedule information on the left side of the check box 755 in which the check mark is written (refer to step S12 to step S27 in FIG. 6).

In the first embodiment, when the date is further ahead in time than the specific timing, the date is automatically corrected, but the present disclosure is not limited to this example. For example, the date need not necessarily be automatically corrected. In this case, the determination as to whether the date is further ahead in time than the specific timing need not necessarily be performed at step S19 and step S20.

Further, the user may be notified when the date is further ahead in time than the specific timing. In addition, when the user has written personal identification information, which is information that identifies an individual, on the paper sheet 701, the personal identification information may be registered in the schedule management software as a personal schedule corresponding to the personal identification information. The personal identification information is, for example, an email address. Hereinafter, a second embodiment will be explained with reference to FIG. 11, which is an embodiment in a case in which the user is notified when the date is further ahead in time than the specific timing, and the personal identification information is registered in the schedule management software as the personal schedule corresponding to the personal identification information.

Figure 11:
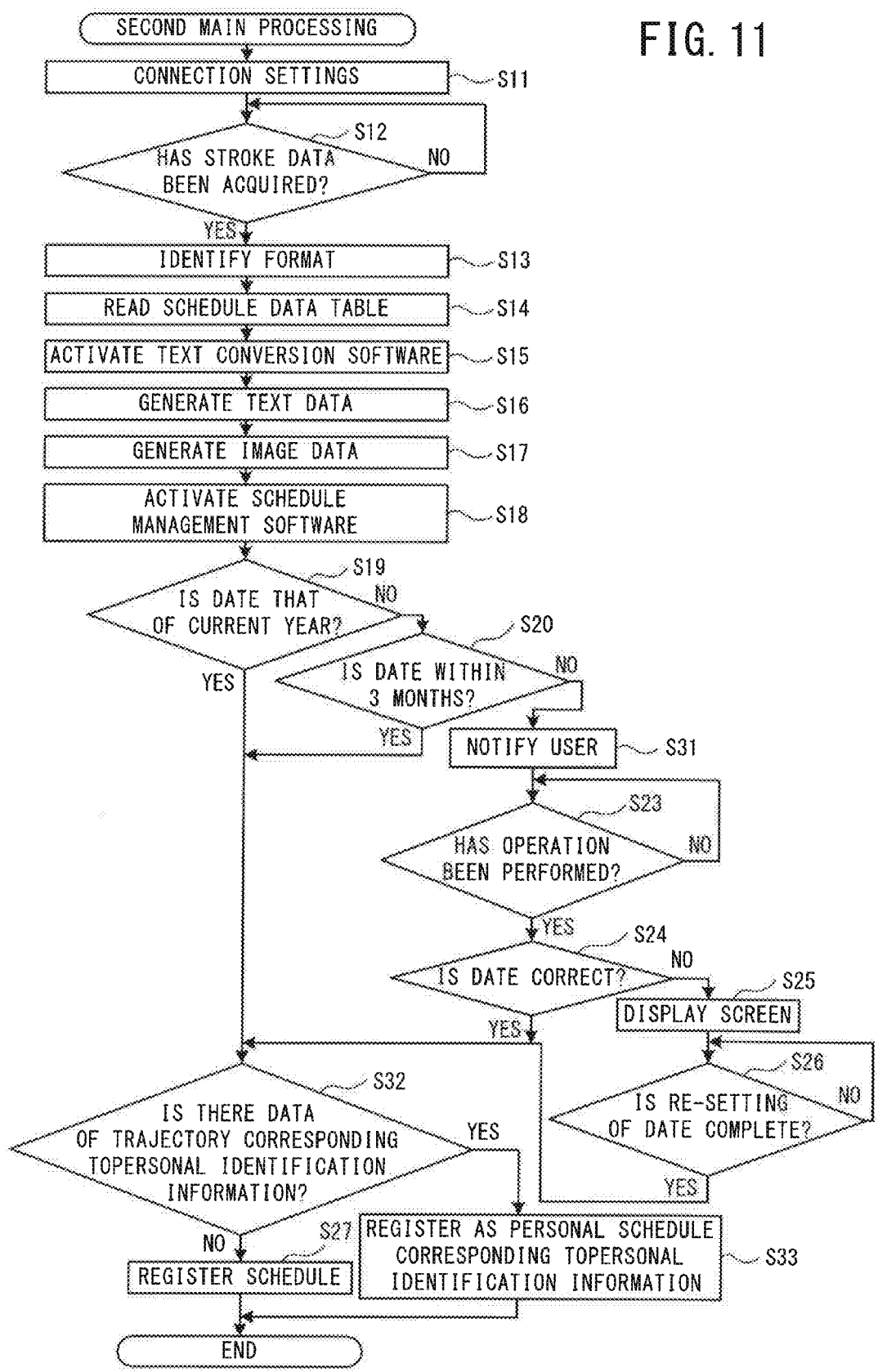
FIG. 11 is a flowchart of second main processing.

FIG. 11 is a flowchart of second main processing according to a modified example of the first main processing (refer to FIG. 6). In the following explanation, processing that is the same as that in the first main processing is denoted by the same reference numerals and a detailed explanation thereof will be omitted. In the second main processing, the processing at step S11 to step S20 is performed in a similar manner to the first main processing. When, at step S19, the date is determined to be the date of the current year (yes at step S19), or when, at step S20, the date is determined to be within 3 months (yes at step S20), processing at step S32 is performed. At step S32, a determination is made as to whether data of the trajectory of the electronic pen 3 corresponding to personal identification information written on the paper sheet 701 is included in the stroke data acquired at step S12 (step S32). In the present embodiment, it is assumed that the personal identification information is an email address. At step S32, the text data generated at step S16 is referred to. Then a determination is made as to whether the email address is included in the text, in the text data, corresponding to the writing area 740 of the paper sheet 701. In that manner, the determination is made as to whether the data of the trajectory of the electronic pen 3 corresponding to the personal identification information written on the paper sheet 701 is included in the stroke data acquired at step S12 (step S32).

When the data of the trajectory of the electronic pen 3 corresponding to the personal identification information is not included in the stroke data acquired at step S12 (no at step S32), the registration of the schedule information is performed (step S27). The processing at step S27 is the same as that of the first main processing (refer to FIG. 6). When the date of the trajectory of the electronic pen 3 corresponding to the personal identification information is included in the stroke data acquired at step S12 (yes at step S32), the schedule information identified from the text data generated at step S16 is registered in the schedule management software as the personal schedule corresponding to the personal identification information (step S33). Further, the image data generated at step S17 is also registered in the schedule management software (step S33).

An example of the processing at step S33 will be explained. The schedule management software according to the second embodiment is able to manage the schedules of a plurality of people together. When the data file of the text data and the data file of the image data are arranged in a specific folder of an individual that can be referred to by the schedule management software, the schedule management software registers the schedule information identified from the text data and the image data as the personal schedule. Further, individual email addresses for each of a plurality of people are stored in the HDD 42 in association with the specific folder of the individual to which the schedule management software can refer. The CPU 41 identifies the email address from the text data generated at step S16. The CPU 41 refers to the HDD 42 and identifies the specific folder of the individual to which the schedule management software can refer and which is associated with the identified email address. Then, the data file of the text data generated at step S16 and the data file of the image data generated at step S17 are arranged in the identified folder of the individual (step S32). In this way, the text data and the image data are registered in the schedule management software as the personal schedule corresponding to the personal identification information. After the processing at step S33 is performed, the second main processing is ended.

When it is determined at step S20 that the date represented by the date information is not the date within 3 months (no at step S20), the user is notified (step S31). At step S31, for example, a message reading: "The date is set as Dec. 15, 2013. Is this correct?" is displayed. Further, at step S31, a display is displayed on the display 48 to allow the user to select whether the date is correct.

Next, the processing at step S23 to step S26 is performed. The processing at step S23 to step S26 is the same as that of the first main processing. Note that, at step S25, the text is displayed on the display 48 based on the text data generated at step S16. The user can change the date of the displayed text and re-set it to the correct date.

When the operation detected at step S23 is the operation indicating that the date is correct (yes at step S24), or when the re-setting of the date is complete (yes at step S26), the processing at step S32 is performed.

The processing of the present embodiment is performed in the above-described manner. In the present embodiment, when the date is further ahead in time than the specific timing (in the present embodiment, the timing that satisfies the conditions of being a date of the current year and being a date within 3 months), the user is notified (step S31). As described above, when the date is further ahead in time than the specific timing, it is possible that the user has made an error in writing the date. Further, when the text data is generated at step S16, there is a possibility that the text is converted to the text that is different to the original text written by the user on the paper sheet 701. In these cases, the user is notified by the processing at step S21, and it is possible to avoid registering the schedule information using a different date in the schedule management software.

In addition, when the user writes the email address that is the personal identification information on the paper sheet 701, it is possible to register the schedule information in the schedule management software as the personal schedule corresponding to the personal identification information by the processing at step S33. The user can select the individuals for which the schedule is to be registered as the personal identification information written on the paper sheet 701, and thus the ease of use is improved for the user.

It should be noted that the personal identification information is described as an email address but is not limited to this example. For example, the personal identification information may be a name of an individual. Further, the personal identification information may be a code (a code such as "A001," for example) that is set for each individual. Further, a writing area in which the personal identification information is to be written may be provided on the paper sheet 701.

In addition, when the notification at step S31 is performed, the text based on the text data generated at step S16 and the image based on the image data generated at step S17 may be displayed on the display 48. Further, the text based on the text data generated at step S16 and the image based on the image data generated at step S17 may be displayed on the display 48 after the image data has been generated at step S17 (refer to FIG. 6 and FIG. 11). In this case, the user can see and compare the text and the image. In this way, for example, when the text data is generated at step S16 and when the text is converted to the text that is different to the original text written on the paper sheet 701 by the user, the user can easily judge that the text has been converted into the different text. As a result, it is possible to easily perform correction of the text data etc. and to establish a state in which the text that is the same as the original text is included in the text data.

Figure 12:
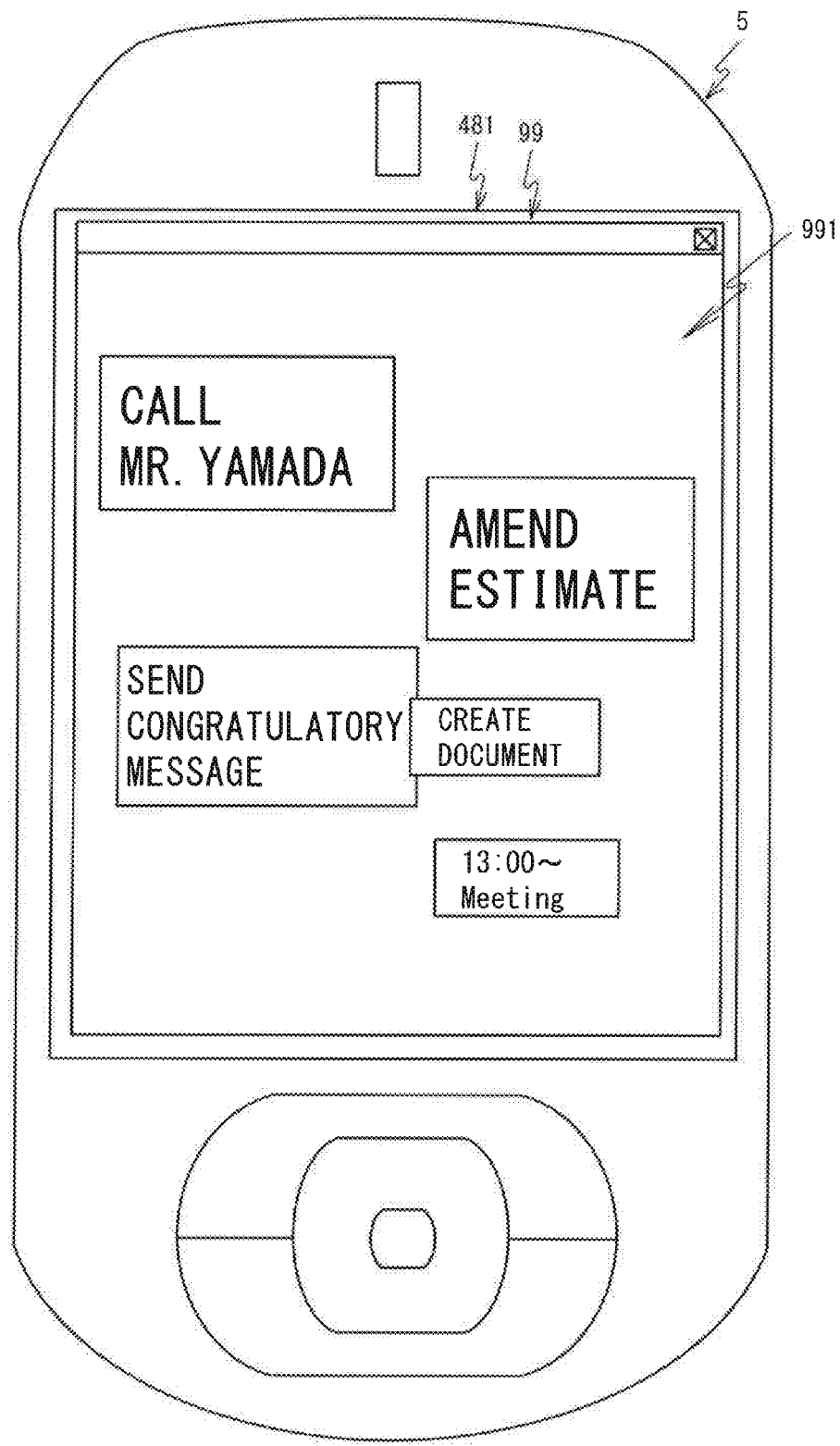
FIG. 12 is a diagram showing a screen 99 displayed on a display 481 of a mobile telephone 5.

In addition, the PC 4 corresponds to the "information management apparatus" of the present disclosure, but the present disclosure is not limited to this example. For example, the "information management apparatus" of the present disclosure may be a mobile telephone 5 that is shown in FIG. 12. In this case, the first main processing may be performed by a CPU provided in the mobile telephone 5.

Further, the schedule management software is not limited to the type of schedule management software described in the first and second embodiments, and a variety of types of the schedule management software may be used. In this case, at step S27 and step S33 (refer to FIG. 6 and FIG. 11), the text data and the image data may be set such that they can be registered in the schedule management software. For example, when the schedule management software is managed by a specific server on the Internet, the text data and the image data may be registered in the schedule management software by transmitting the text data and the image data to the server.

Further, for example, the schedule management software may be a software that can paste the text based on the schedule information on a screen 99 that is displayed on a display 481 of the mobile telephone 5, as shown in FIG. 12. A pasting area 991, on which the schedule information can be pasted, is provided on the screen 99 shown in FIG. 12. Then, a plurality of texts corresponding to the schedule information (for example, information written in the writing area 713 (refer to FIG. 3) from among the schedule information) are pasted into the pasting area 991 in a tag-like manner. More specifically, various schedules, such as "Call Mr. Yamada," "Correct estimate," "Send congratulatory message," "Create document" and "13:00—Meeting" are pasted in a tag-like manner.

Figure 13:
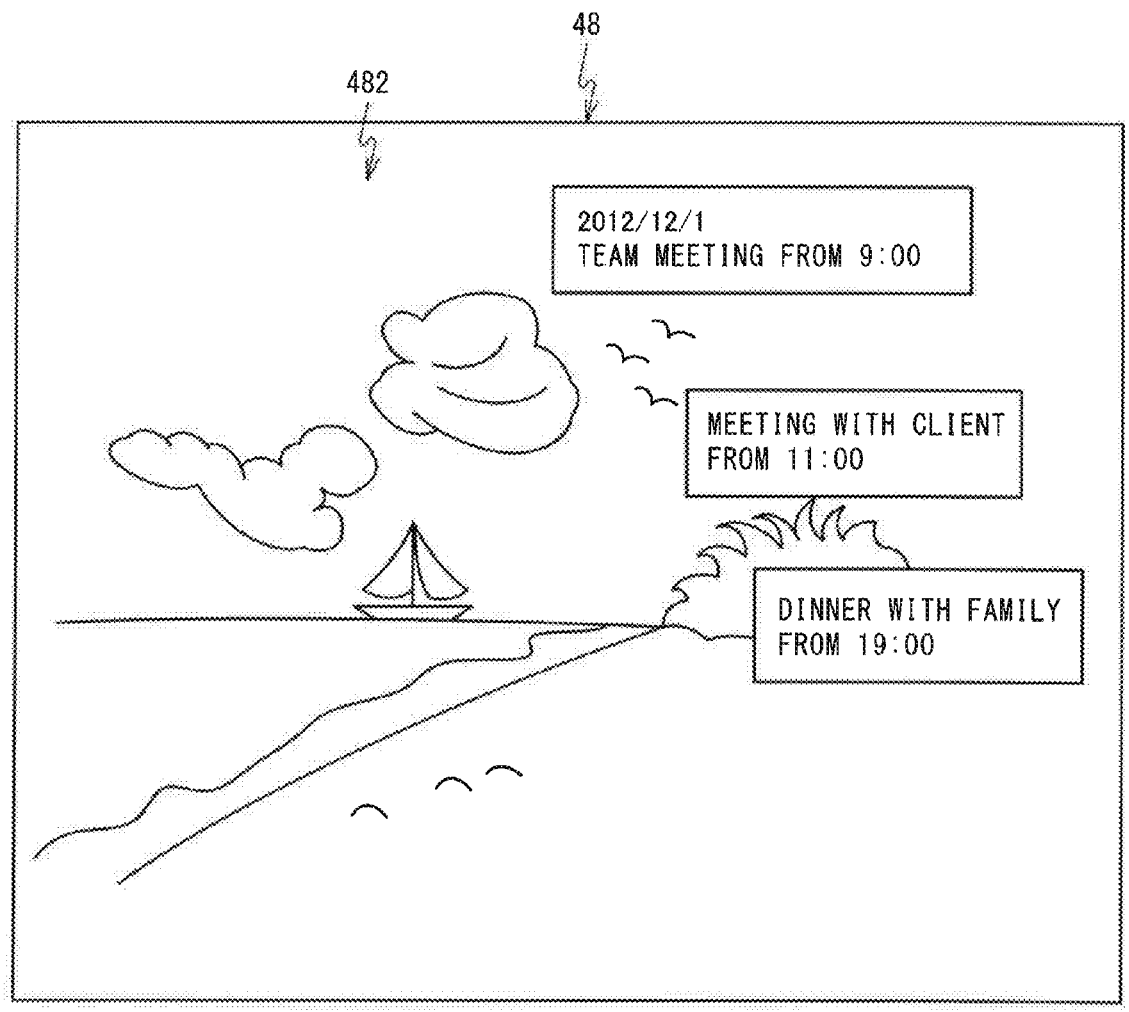
FIG. 13 is a diagram showing a state in which texts corresponding to the schedule information are displayed on a desktop screen 482 that is displayed on the display 48.

Alternatively, the schedule management software may be a software that can paste the plurality of texts corresponding to the schedule information in the tag-like manner on a right side portion of a desktop screen 482 of the display 48 of the PC 4, as shown in FIG. 13. Note that, in addition to the texts pasted in the tag-like manner, an image including a boat and clouds etc. is also displayed on the desktop screen 482 shown in FIG. 13.

The text based on the text data and the image based on the image data that are registered in the schedule management software at step S27 (refer to FIG. 6 and FIG. 11) or at step S33 (refer to FIG. 11) may be displayed when the user selects the text displayed in FIG. 12 and FIG. 13. Note that the image based on the image data need not necessarily be displayed. In this case, the image data need not necessarily be registered in the schedule management software at step S27 or at step S33. Further, the schedule management software may have a notification function that notifies the user when the timing of the schedule approaches.

What is claimed is:

1. An information management apparatus comprising:
a processor, and
a memory configured to store computer-readable instructions that, when executed, cause the processor to perform processes comprising:
acquiring stroke data, the stroke data being data of a trajectory of a writing device within a plurality of writing areas within a paper medium, the stroke data being detected by a detection portion capable of detecting the trajectory and including data of the trajectory of the writing device corresponding to schedule information written on the paper medium, the writing device comprising a coil held between a core body and a condenser, wherein each of the plurality of writing areas within the paper medium has a predetermined position;
generating image data of the trajectory based on the acquired stroke data, the image data maintaining the predetermined position of each of the plurality of writing areas;
generating text data based on the acquired stroke data; and
registering and managing the schedule information and the image data within a schedule management application, the schedule information being identified from the text data, wherein a user of the schedule management application may view the image data and the text data within the schedule management application.

2. The information management apparatus according to claim 1, wherein
the computer-readable instructions further cause the processor to perform processes comprising:
notifying a user that a date is further ahead in time than a specific timing, when the date indicated by date information included in the schedule information identified from the text data is further ahead in time than the specific timing.

3. The information management apparatus according to claim 1, wherein
the computer-readable instructions further cause the processor to perform processes comprising:
automatically correcting a date when the date indicated by date information included in the schedule information identified from the text data is further ahead in time than a specific timing.

4. The information management apparatus according to claim 1, wherein
the registering and managing of the schedule information and the image data includes registering and managing the schedule information of an individual as a personal schedule corresponding to personal identification information when registering and managing the schedule information identified from the text data, the personal identification information being information that is written on the paper medium and that identifies the individual and being information that corresponds to the data of the trajectory of the writing device included in the acquired stroke data.

5. A non-transitory computer-readable medium storing computer-readable instructions that, when executed, cause an information management apparatus to perform processes comprising:

acquiring stroke data, the stroke data being data of a trajectory of a writing device within a plurality of writing areas within a paper medium, the stroke data being detected by a detection portion capable of detecting the trajectory and including data of the trajectory of the writing device corresponding to schedule information written on the paper medium, the writing device comprising a coil held between a core body and a condenser, wherein each of the plurality of writing areas within the paper medium has a predetermined position;

generating image data for the trajectory based on the acquired stroke data, the image data maintaining the predetermined position of each of the plurality of writing areas;

generating text data from the acquired stroke data; and registering and managing the schedule information identified from the generated text data and the generated image data within a schedule management application, wherein the image data and the text data are selectably viewable within the schedule management application.

6. The non-transitory computer-readable medium according to claim 5, wherein the computer-readable instructions further cause the information management apparatus to perform processes comprising:

notifying a user that a date is further ahead in time than a specific timing, when the date indicated by date information included in the schedule information identified from the text data is further ahead in time than the specific timing.

7. The non-transitory computer-readable medium according to claim 5, wherein the computer-readable instructions further cause the information management apparatus to perform processes comprising:

automatically correcting a date when the date indicated by date information included in the schedule information identified from the text data is further ahead in time than a specific timing.

8. The non-transitory computer-readable medium according to claim 5, wherein the registering and managing of the schedule information and the image data includes registering and managing the schedule information of an individual as a personal schedule corresponding to personal identification information when registering and managing the schedule information identified from the text data, the personal identification information being information that is written on the paper medium and that identifies the individual and being information that corresponds to the data of the trajectory of the writing device included in the acquired stroke data.

\* \* \* \* \*